United States Patent [19]

Dietz

[11] Patent Number: 4,668,005

[45] Date of Patent: May 26, 1987

[54] SUN VISOR FOR VEHICLES

[75] Inventor: Günter Dietz, Wuppertal, Fed. Rep. of Germany

[73] Assignee: Gebr. Happich GmbH, Fed. Rep. of Germany

[21] Appl. No.: 904,787

[22] Filed: Sep. 4, 1986

Related U.S. Application Data

[63] Continuation of Ser. No. 606,697, May 3, 1984, abandoned.

[30] Foreign Application Priority Data

Jun. 24, 1983 [DE] Fed. Rep. of Germany ....... 3322736

[51] Int. Cl.$^4$ .............................................. B60J 3/02
[52] U.S. Cl. ............................... 296/97 H; 296/97 K; 296/97 R; 24/625
[58] Field of Search .................. 296/97 R, 97 H, 97 K; 24/625

[56] References Cited

U.S. PATENT DOCUMENTS 3,577,608  5/1971  Texler ................................... 24/625

FOREIGN PATENT DOCUMENTS

| 254503 | 8/1963 | Australia | 296/97 K |
| 1849602 | 4/1962 | Fed. Rep. of Germany . | |
| 8125330 | 7/1982 | Fed. Rep. of Germany . | |
| 357409 | 9/1931 | United Kingdom | 296/97 K |
| 1033981 | 6/1966 | United Kingdom | 296/97 H |

Primary Examiner—Randolph A. Reese
Assistant Examiner—Dennis H. Pedder
Attorney, Agent, or Firm—Ostrolenk, Faber, Gerb & Soffen

[57] ABSTRACT

The disclosure concerns a sun visor for a vehicle, having a cushioned body with a reinforcing, stiffening wire insert disposed in it. A mounting shaft is at one end of one edge of the body and a mounting pin extending parallel to the longitudinal edges is at the other end of the one longitudinal edge of the body. The mounting pin is supported on a pair of legs attached to a base plate of a structural member, which is supported in a trough at one of the wide surfaces of the cushioned body. The mounting pin is disposed in a recess formed at the one longitudinal edge. The base plate of the mounting pin has a spring clip disposed perpendicularly to the wide surfaces which engages the wire insert or a holding plate secured to the wire insert to hold the base plate in place.

21 Claims, 4 Drawing Figures

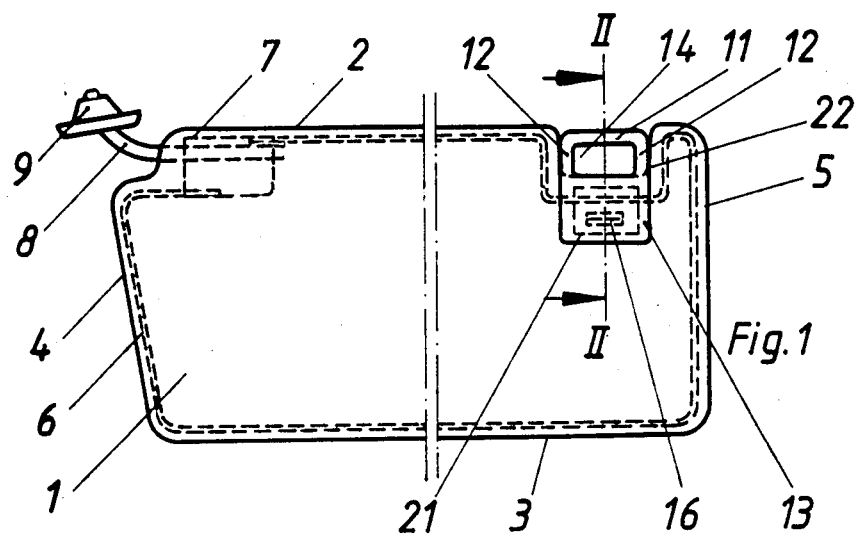
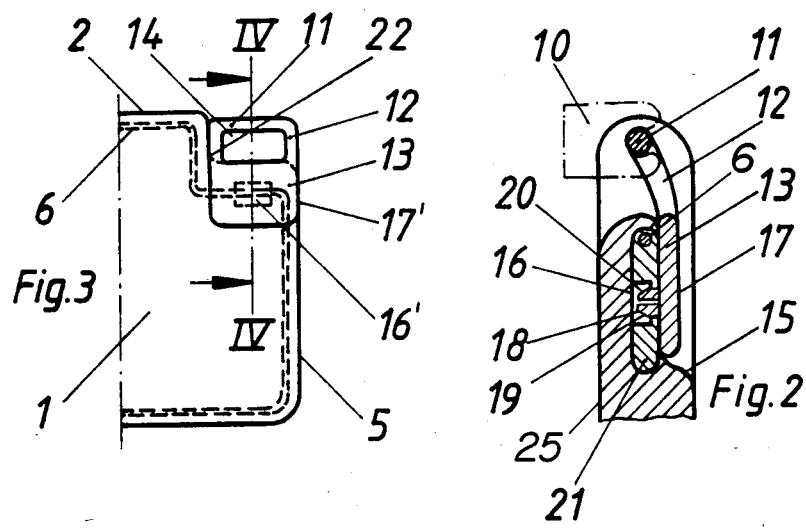
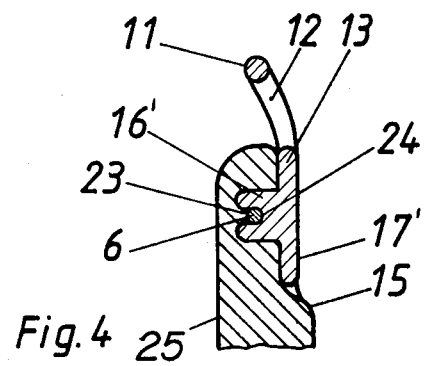

SUN VISOR FOR VEHICLES

This is a continuation of application Ser. No. 606,697, filed May 3, 1984, abandoned.

BACKGROUND OF THE INVENTION

The present invention relates to a sun visor for automotive vehicles, the visor having a cushioned visor body which is embedded in a covering foil and is stiffened by an inserted reinforcing insert. The invention particularly relates to the mounting pin unit by which the visor body is separably attached to an additional or outer support.

At one end region of one of its longitudinal edges, the sun-visor body has a mounting shaft which has one end embedded in the visor body and its other end is received by a swivel bearing. At the other end region of the one longitudinal edge, within a recess therein, there is a mounting pin which can be removably engaged in the mounting receiver of an outer support. The mounting pin is defined by the web of a structural member, which connects the ends of two supporting legs to each other.

Federal Republic of Germany Utility Model DE-Gbm No. 81 25 330 discusses the manufacturing problem of so attaching the mounting pin in the cushioning body that the step of covering of that body by the foil-like covering is not interfered with by the mounting pin. The covering comprises a separate foil covering both sides of the cushioning body. The two foils are then welded together in one operation along the edge of the sun-visor body, and following the contour of the body.

The aforesaid German publication states that this problems is solved in two different ways in the prior art. One solution contemplates including the mounting pin within the foil-like covering, i.e. also covering the pin with the foil. The other solution contemplates fastening the mounting pin only in a support member which is provided for this purpose after the foil-like covering has been completed. The support pin is introduced through edge-side openings in the foil.

Federal Republic of Germany Utility Model DE-Gbm No. 81 25 330 refers to the second solution with a free-lying mounting pin. It concerns a sun visor in which the mounting pin, which is straight from end to end, is inserted at its end regions through openings in the covering into an insertion hole in one or the other leg of an approximately U-shaped holding yoke that is fastened within the covering in the sun-visor body. The mounting pin is secured in the one insertion hole against turning and is secured in the other insertion hole against axial displacement with respect to the holding yoke. In this known visor, it is necessary to incorporate a holding yoke within the sun-visor body. This makes the manufacture of the sun visor difficult and expensive. Furthermore, it is necessary, first of all, to introduce the mounting pin into the insertion hole. This permits axial displaceability. It is only after the mounting pin has been introduced that the pin is axially secured by now pushing the mounting pin back into the other insertion hole, possibly utilizing a snap action. This type of assembly requires, at the least, a considerable amount of dexterity and appears, viewed as a whole, to require an extremely large amount of time and work.

Federal Republic of Germany Utility Model DE-Gbm No. 1 849 602 shows a sun visor for vehicles which has a rotary mount arranged in a recess in the cushioning body. This mount is connected with the inner wire frame of the visor. The shaft of the rotary mount is formed by the web of a U-shaped yoke whose legs are passed through the cushioning material with the formation of the recess and dig into the holding means for the wire frame. With this sun visor, an unattractive bulging of the cushioning material is easily produced upon the anchoring of the yoke. It is disadvantageous from the standpoint of manufacture that it is absolutely necessary to fasten to the wire frame a holding means which, in practice, consists of a sheet-metal housing welded to the wire frame.

SUMMARY OF THE INVENTION

The object of the present invention is to improve a sun visor of the aforementioned kind with respect to the formation and arrangement of the mounting pin and particularly to simplify the mounting of the pin after the completion of the covering which surrounds the cushioning body.

According to the invention, the structural member of which the mounting pin is a part is arranged lying on a wide side surface of the sun-visor body and is held on the sun-visor body by fastening means which act perpendicularly to that wide surface.

The structural member which includes the mounting pin can be a mass-produced article and can be produced rapidly, simply and inexpensively and can be fastened in a particularly simple manner to the body of the sun visor, for instance, by screws, rivets, adhesive or any combination of these measures. Since the structural member is placed on the completely covered sun-visor body, it is no longer necessary to provide interruptions in the weld seam of the covering and to force the mounting pin through such interruptions. The structural member can be of compact development and thus would not impair the external appearance of the sun visor. It can be adapted in color to the specific color of the covering, although, of course, it is also possible to use a complementary color. The outer appearance of the sun visor can be further improved by arranging the structural member in a trough-shaped depression in the sunvisor body.

The structural member is advantageously fastened to the reinforcing insert by at least one anchoring element which passes through the covering sheet, and the cushioning body and extends up to the reinforcing insert.

In another development of the invention, the leg ends of the structural member which extend away from the mounting pin are also connected to each other by a base plate. Further, the structural member may be a plastic injection molding. It is particularly advantageous to develop the anchoring element for the structural element as a clip, preferably in one piece with the base plate of the structural member. The clip has a free end region with at least two spring arms which extend at a distance from and parallel to each other and which have detent projections developed on their outer sides. The arms of the clip can be arranged in snap-like manner in the opening in a holding plate connected with the reinforcing insert. Alternately, the clip can define at the region of its free end a slot which permits its arms to grip over the reinforcing insert and which debouches into an undercut receiving opening for the reinforcing insert. In each case, the structural member can be mounted particularly rapidly and easily by simply pressing its clip into the sun-visor body, which is true even if prepunching of the covering and possibly also of the cushioning material should be necessary, depending on the composition of the material of the covering and/or of the cushioning material. It is advantageous to arrange the attachment element so that it cannot be seen by a viewer, i.e. through its invisible manner of attachment.

The legs of the structural member are curved in the central plane of the sun-visor body for arranging and aligning of the mounting pin.

The mounting pin also can be arranged within a recess located a short distance in front of the corresponding end of the sun-visor body or within a recess located directly at the corresponding end. In both cases a clean, decorative closure is obtained.

Other objects and features of the invention are described below with reference to the illustrative embodiments shown on the accompanying drawings.

BRIEF DESCRIPTION OF THE DRAWINGS

FIG. 1 shows a first embodiment of the sun visor;

FIG. 2 shows, on a larger scale, a section through a fragment along the line II—II of FIG. 1;

FIG. 3 shows one side of a second embodiment of the sun visor, and

FIG. 4 shows, on a larger scale, a section through a fragment along the line IV—IV of FIG. 3.

DESCRIPTION OF THE PREFERRED EMBODIMENTS

The sun visor shown in FIGS. 1 and 2 includes a sun-visor body 1 developed as a cushioned body of an approximately rectangular outer contour and a flat shape. The body 1 is covered by a protective foil layer 25 which follows the contours of the body, including its below described recess and depression. The sun-visor body 1 has an upper longitudinal edge 2, a lower longitudinal edge 3, and opposite side edges 4 and 5. Near, inwardly of and approximately parallel to the edges 2 to 5, a reinforcing insert 6 comprised of a wire frame is incorporated in the sun-visor body 1.

Within the region of its upper longitudinal edge 2, on the left-hand side of FIG. 1, the sun-visor body 1 has an incorporated mounting housing 7. This is fastened to the reinforcing insert 6. One leg of an L-shaped mounting shaft 8 is supported within the housing. The other leg of that shaft is seated on a swivel bearing 9 that is adapted to be fastened to the body of a vehicle. On the right-hand side of FIG. 1, also in the region of the upper longitudinal edge 2 of the body 1, there is an outer-support housing 10 (see FIG. 2) provided on the body of the vehicle and there is a mounting pin 11, which can be detachably engaged in the mounting receiver of the outer support housing. The mounting pin 11 is generally aligned with the leg of the mounting shaft 8 which is located in the mounting housing 7 and they form a common axis of rotation of the visor.

The mounting pin 11 connects the ends of two legs 12, which extend parallel to and are spaced from each other and which are also connected together at the bottom end by a base plate 13. Mounting pin 11, legs 12 and base plate 13 surround and define a window-like opening 14. The base plate 13 is placed on one surface of the sun-visor body 1. In the region of the application of the plate 13, the visor body has a trough-shaped depression 15 the depth of which is at least such that the base plate 13 does not project outside the outer surface of the sun-visor body 1, but is preferably received countersunk in the sun-visor body 1. The base plate lies over the covering foil layer beneath it. On its side facing the sun-visor body 1, the base plate 13 has at least one fastening element, which is developed as a clip 16.

Preferably, the mounting pin 11, the legs 12, the base plate 13 and the clip 16 together define a single-piece integral structural member 17 which is preferably a plastic injection molding.

The clip 16 has two spring arms 18 which are arranged at a distance from each other, extend parallel to each other and have external detect projections 19. These projections snap into the opening 20 of a holding plate 21 which is attached to the reinforcement insert 6, as is shown in FIG. 2. The plate 21 sits in a corresponding recess formed in the visor body, e.g. the plate 21 is positioned and the body is formed around the plate 21 and the insert 6. The covering foil layer covers the outside of the plate 21, whereby the clip arms 18 pierce the foil layer to extend to the plate 21.

The upper longitudinal edge 2 of the sun-visor body 1 in FIG. 1 has a recess 22 near the edge 5. This is a depression into the visor body down from its edge 2 and above depression 15. The member 17 and its base plate 13 is so placed that the mounting pin 11 and the legs 12 are placed in the recess 22. The width of the structural member 17 corresponds to the width of the recess 22 so that a clean, estheticaly pleasing closure is obtained. The width of the structural member 17 also corresponds at least approximately to its height.

Legs 12 are curved in shape to curve around body 1 between base plate 13 and mounting pin 11 so that mounting pin 11 is supported in about the central plane of body 1.

FIGS. 3 and 4 show another embodiment of the sun visor. Those parts corresponding to parts shown in FIGS. 1 and 2 have the same reference numbers. In FIG. 3, only that half of the sun visor having the outer support is shown. The outer support is arranged within a recess 22 in the outermost right corner region of the upper longitudinal edge 2 of the sun-visor body 1 and in the upper corner region of the end edge 5. In this case also the outer support includes an outer-support housing (see FIG. 2) and a mounting pin 11 which is developed, corresponding to FIGS. 1 and 2, as a single piece with two legs 12, a base plate 13 and a clip 16' to form structural member 17'. The clip 16' is provided here on its free end region with a slot 23 which is capable of gripping the reinforcing insert 6. The slot debouches into an undercut receiving opening 24 for the reinforcing insert 6.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A sun visor for vehicles, comprising;
   a cushioned sun-visor body having opposite wide surfaces; a reinforcing insert in the body for stiffening the body;
   the body having one longitudinal edge between the wide surfaces and having a mounting shaft at the one edge for being received in a swivel bearing in the vehicle;
   the body having a recess therein which is spaced from the mounting shaft and which is at the one edge;
   a structural member comprising a mounting pin and a pair of support legs; the structural member being removably disposed in the recess; an outer receiver support in the vehicle; the mounting pin being removably receivable in said receiver support; the mounting pin extending generally along the same direction as the one longitudinal edge; the pair of support legs being attached to and holding up the mounting pin, and the mounting pin extending between the support legs; the structural member resting on one of the wide surfaces of the body; and fastening means adapted to act perpendicularly to the one wide surface for holding the structural member to the body.

2. The sun visor of claim 1, wherein the body is embedded in a covering foil.

3. The sun visor of claim 1, wherein the mounting shaft is generally at one end of the one edge, while the recess is generally at the opposite end of the one edge.

4. The sun visor of claim 3, wherein the mounting shaft is embedded in the body.

5. The sun visor of claim 1, wherein the body has a trough-shaped depression defined in it at the one wide surface, and the structural member is disposed in the depression.

6. The sun visor of claim 5, wherein the recess in the one longitudinal edge is above the depression in the body.

7. The sun visor of claim 1, wherein the structural member is fastened to the reinforcing insert.

8. The sun visor of claim 7, wherein the structural member has an anchoring element on the one side thereof which is facing toward the body and which extends through the body to be in engagement with the insert.

9. The sun visor of claim 8, wherein the body is embedded in a covering foil; the structural member being disposed outside the foil; and the anchoring element extending through the covering foil to be in engagement with the insert.

10. The sun visor of claim 8, wherein the anchoring element is a clip.

11. The sun visor of claim 10, wherein the clip includes two spring arms, which are spaced apart and which are deformable toward each other; detect projections on the outwardly facing sides of the spring arms; a holding plate on the insert, the holding plate having an opening defined in it, and the spring arms being snap connectable at the detents of the arms into the opening in the holding plate, whereby the structural element is in engagement with the insert.

12. The sun visor of claim 10, wherein the clip has a free end with a slot defined in the free end which is facing toward the insert; the slot being shaped and placed for receiving the insert to extend through the slot; and the clip engaging the insert in the slot.

13. The sun visor of claim 1, wherein the structural member comprises a base plate which is spaced from the mounting pin and which is also attached to and joins the legs between which the mounting pin extends.

14. The sun visor of claim 13, wherein the body has a trough-shaped depression defined in it at the one surface thereof and the base plate of the structural member is disposed in the depression.

15. The sun visor of claim 13, wherein the base plate of the structural member has one side face toward the body and further has an anchoring element on the one side of the base plate that is facing toward the body, the anchoring element extending through the body and engaging with the insert in the body.

16. The sun visor of claim 13, wherein the structural member is a plastic injection molding.

17. The sun visor of claim 15, wherein the anchoring element is a clip extending from the base plate.

18. The sun visor of claim 13, wherein the body has a trough-shaped depression defined in it at the one surface thereof and the base plate of the structural member is disposed in the depression; the support legs being curved in shape between the base plate of the structural member and the mounting pin of the structural member and the curvature being such that the mounting pin is thereby supported in about the central plane of the body.

19. The sun visor of claim 1, wherein the support legs are curved in shape as the legs extend from the body to the mounting pin so that the mounting pin is in about the central plane of the body.

20. The sun visor of claim 1, wherein the recess is located very near a respective end of the longitudinal edge.

21. The sun visor of claim 1, wherein the recess is located at a respective end of the longitudinal edge.

* * * * *